US009576276B2

(12) United States Patent
Stern et al.

(10) Patent No.: US 9,576,276 B2
(45) Date of Patent: Feb. 21, 2017

(54) CONTEXT-INFORMED SUMMARIZATION OF COMMUNICATIONS

(75) Inventors: Edith Helen Stern, Yorktown Heights, NY (US); Liam Harpur, Dublin (IE); Patrick Joseph O'Sullivan, Dublin (IE); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 12/955,423

(22) Filed: Nov. 29, 2010

(65) Prior Publication Data
US 2012/0136939 A1 May 31, 2012

(51) Int. Cl.
*G06Q 10/10* (2012.01)
*H04L 12/58* (2006.01)

(52) U.S. Cl.
CPC ............ *G06Q 10/107* (2013.01); *H04L 51/16* (2013.01); *G06Q 10/10* (2013.01); *H04L 51/22* (2013.01)

(58) Field of Classification Search
CPC ...... G06Q 10/107; G06Q 10/10; G06Q 50/01; H04L 51/00; H04L 51/02; H04L 51/16; H04L 51/22; H04L 51/24; H04L 51/34; H04L 51/36; H04L 51/046; H04L 67/02; H04W 4/14; H04W 4/12; H04W 4/18
USPC ................... 709/206, 207; 715/752, 753
See application file for complete search history.

(56) References Cited

U.S. PATENT DOCUMENTS

| | | | |
|---|---|---|---|
| 5,905,777 A | 5/1999 | Foladare et al. | |
| 6,533,822 B2 * | 3/2003 | Kupiec | 715/253 |
| 2005/0210116 A1 | 9/2005 | Samson | |
| 2005/0262214 A1 * | 11/2005 | Bagga et al. | 709/207 |
| 2007/0112921 A1 * | 5/2007 | Lunt et al. | 709/206 |
| 2007/0198645 A1 | 8/2007 | Chen et al. | |
| 2008/0005247 A9 * | 1/2008 | Khoo | G06F 3/0482 709/206 |
| 2008/0195717 A1 * | 8/2008 | Brown | 709/207 |
| 2008/0244372 A1 | 10/2008 | Rohall et al. | |
| 2008/0281922 A1 | 11/2008 | Renshaw et al. | |
| 2009/0265763 A1 * | 10/2009 | Davies et al. | 726/3 |
| 2009/0292780 A1 * | 11/2009 | Ramesh | G06Q 10/107 709/206 |
| 2010/0036732 A1 * | 2/2010 | Stafford et al. | 705/14.54 |
| 2011/0010182 A1 * | 1/2011 | Turski | G06Q 10/107 705/1.1 |
| 2011/0035681 A1 * | 2/2011 | Mandel et al. | 715/752 |
| 2011/0208816 A1 * | 8/2011 | Chavez | 709/206 |
| 2012/0144292 A1 * | 6/2012 | Lee | G06F 17/212 715/243 |

* cited by examiner

*Primary Examiner* — Yemane Mesfin
*Assistant Examiner* — Peter Chen
(74) *Attorney, Agent, or Firm* — Brian J. Colandreo, Esq.; Jeffrey T. Placker, Esq.; Holland & Knight LLP

(57) ABSTRACT

A method and computer program product for context-informed summarization is described. A method may comprise determining, via a computing device, a context of a communication. The method may further comprise determining, via the computing device, a summarization attribute for the communication based upon, at least in part, the context of the communication. The method may also comprise creating a summary of the communication based upon, at least in part, the summarization attribute.

20 Claims, 6 Drawing Sheets

Email Message

From: Brenda
To: Grace
Cc: Steph, Allison
Subject: Winter Meeting

Sent: Thur 11/03/2010 5:17 PM

Grace,

This year I would like you to plan the Winter Meeting for the group. You did such a great job with the Summer Meeting that Steph suggested you plan the Winter Meeting as well. Thought the 4 of us should meet for lunch tomorrow to plan what we should go over in the Winter Meeting presentation, who to invite to the meeting, and where the meeting should be. If you could make a reservation tomorrow at the restaurant that would be great. Also, please make a punch list of things to go over and anything else you want to address.

Thanks,
Brenda

---

Email Summary Brenda/Grace Thur 11/03/2010 5:17 PM
Recipient: Brenda
Winter Meeting Lunch Reservation Tomorrow Email Summary Brenda/Grace Thur 11/03/2010 5:17 PM
Recipient: Grace
Winter Meeting Plan

CONTEXT-INFORMED SUMMARIZATION OF COMMUNICATIONS

BACKGROUND OF THE INVENTION

Individuals may exchange many emails, have many instant message (IM) chats/conversations, or electronically communicate in a number of other ways. Large amounts of electronic communications may result in communications overload. As such, individuals or others may desire summaries of their communications with each other for ease of reference, to save time, etc. Different types of summaries may be desired by some individuals or communication participants in certain circumstances, depending the context of the communication.

BRIEF SUMMARY OF THE INVENTION

In a first embodiment, a method may comprise, determining, via a computing device, a context of a communication. The method may further comprise determining, via the computing device, a summarization attribute for the communication based upon, at least in part, the context of the communication. The method may also comprise creating a summary of the communication based upon, at least in part, the summarization attribute.

One or more of the following features may be included. The method may include determining a recipient attribute for the summary of the communication based upon, at least in part, the context of the communication. The method may also include sending the summary of the communication to a recipient based upon, at least in part, the recipient attribute. The context of the communication may include at least one of: one or more parties involved, one or more parties invited, a time of the communication, a duration of the communication, a topic of the communication, and an organizational relationship of the one or more parties involved. At least one of the summarization attribute and the recipient attribute may be further determined based upon, at least in part, a defined policy. Further, at least one of a length of the summary of the communication and one or more filters for the summary of the communication may be based upon, at least in part, a defined policy.

In some implementations, the defined policy may include at least one of: a minimum communication size, a hierarchical relationship policy, an organizational relationship policy, a degree of separation policy, a communication content policy, an attendance policy, and a participation policy. The communication may include multiple communications and the summary of the communication may include summaries of one or more of the multiple communications based upon, at least in part, an organizational relationship policy. Different summaries of the communication may be created based upon, at least in part, different defined policies of two or more parties involved in the communication. The communication may be at least one of: an instant message chat, a text message, a text message chain, an email, an email chain, a tweet, a series of tweets, a blog comment, a series of blog comments, a web conference, a teleconference, a series of changes made to a document, and a series of comments made regarding a document.

In second embodiment, a computer program product may reside on a computer readable storage medium and may have a plurality of instructions stored on it. When executed by a processor, the instructions may cause the processor to perform operations comprising determining a context of a communication. The operations may further comprise determining a summarization attribute for the communication based upon, at least in part, the context of the communication. The operations may also comprise creating a summary of the communication based upon, at least in part, the summarization attribute.

One or more of the following features may be included. The operations may include determining a recipient attribute for the summary of the communication based upon, at least in part, the context of the communication. The operations may also include sending the summary of the communication to a recipient based upon, at least in part, the recipient attribute. The context of the communication may include at least one of: one or more parties involved, one or more parties invited, a time of the communication, a duration of the communication, a topic of the communication, and an organizational relationship of the one or more parties involved. At least one of the summarization attribute and the recipient attribute may be further determined based upon, at least in part, a defined policy. Further, at least one of a length of the summary of the communication and one or more filters for the summary of the communication may be based upon, at least in part, a defined policy.

In some implementations, the defined policy may include at least one of: a minimum communication size, a hierarchical relationship policy, an organizational relationship policy, a degree of separation policy, a communication content policy, an attendance policy, and a participation policy. The communication may include multiple communications and the summary of the communication may include summaries of one or more of the multiple communications based upon, at least in part, an organizational relationship policy. Different summaries of the communication may be created based upon, at least in part, different defined policies of two or more parties involved in the communication. The communication may be at least one of: an instant message chat, a text message, a text message chain, an email, an email chain, a tweet, a series of tweets, a blog comment, a series of blog comments, a web conference, a teleconference, a series of changes made to a document, and a series of comments made regarding a document.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

FIG. 3 is an email message and example summaries which may be associated with the context-informed summarization process of FIG. 1;

FIG. 4 is a graphical user interface that may be associated with the context-informed summarization process of FIG. 1;

DETAILED DESCRIPTION OF THE INVENTION

Figure 1:
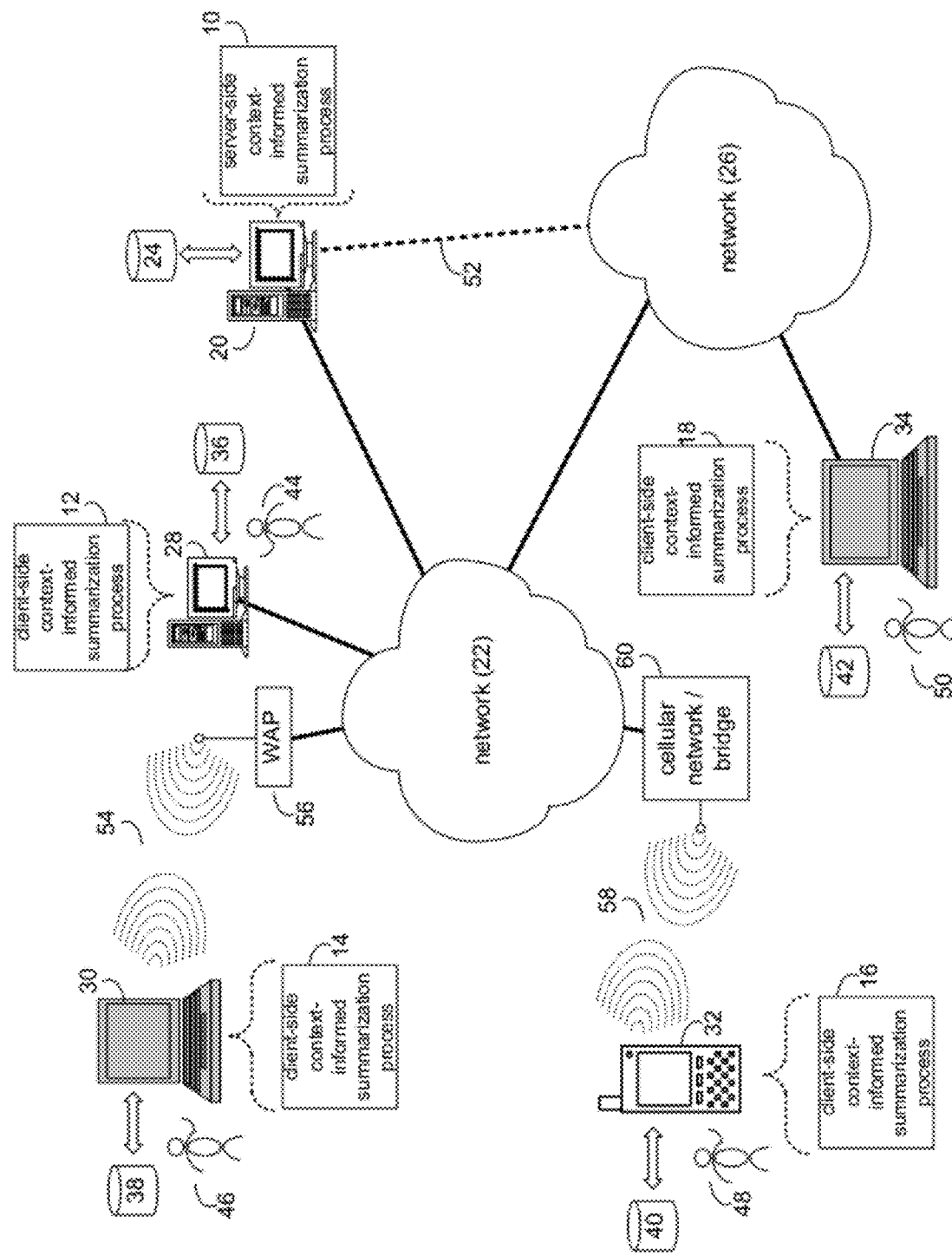
FIG. 1 is a diagrammatic view of a context-informed summarization process coupled to a distributed computing network.
Figure 2:
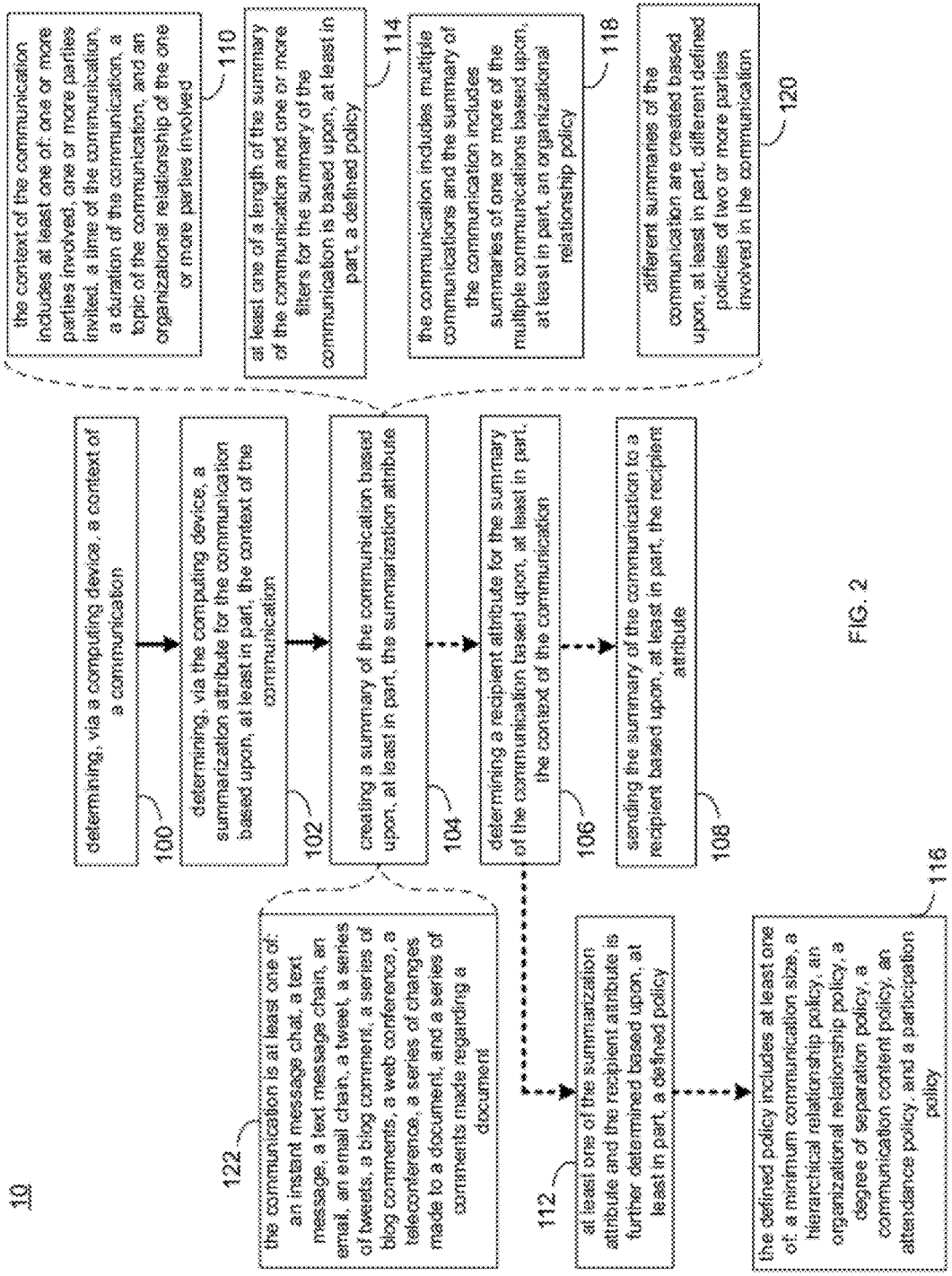
FIG. 2 is a flowchart of the context-informed summarization process of FIG. 1.

Referring to FIGS. 1 & 2, there is shown a context-informed summarization process 10. As will be discussed below, context-informed summarization process 10 may determine 100 a context of a communication. Context-informed summarization process 10 may further determine 102 a summarization attribute for the communication based upon, at least in part, the context of the communication.

The context-informed summarization (CIS) process may be a server-side process (e.g., server-side CIS process 10), a client-side process (e.g., client-side CIS process 12, client-side CIS process 14, client-side CIS process 16, or client-side CIS process 18), or a hybrid server-side/client-side process (e.g., the combination of server-side CIS process 10 and one or more of client-side CIS processes 12, 14, 16, 18).

Server-side CIS process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side CIS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side CIS processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side CIS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side CIS processes 12, 14, 16, 18 and/or server-side CIS process 10 may be processes that run within (i.e., are part of) a communications management application, email application, and/or group chat and/or instant messaging application. Alternatively, client-side CIS processes 12, 14, 16, 18 and/or server-side CIS process 10 may be stand-alone applications that work in conjunction with the communications management application, email application, group chat and/or instant messaging application. One or more of client-side CIS processes 12, 14, 16, 18 and server-side CIS process 10 may interface with each other (via network 22 and/or network 26) to allow a plurality of users (e.g., users 44, 46, 48, 50) to share information. In one implementation client-side CIS processes 12, 14, 16, 18 and/or server-side CIS process 10 may be processes that run within or in connection with a unified communications and collaboration application, including but not limited to Lotus® Sametime®.

Users 44, 46, 48, 50 may access server-side CIS process 10 directly through the device on which the client-side CIS process (e.g., client-side CIS processes 12, 14, 16, 18) is executed, namely client electronic devices 28, 30, 32, 34, for example. Users 44, 46, 48, 50 may access server-side CIS process 10 directly through network 22 and/or through secondary network 26. Further, server computer 20 (i.e., the computer that executes server-side CIS process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Context-Informed Summarization Process

CIS process 10 may allow users communicating electronically to create summaries of their electronic communications based upon the context of the electronic communication. Further, CIS process 10 may allow users to send and receive these summaries based upon the context of the electronic communication as well. For the following discussion, server-side CIS process 10 will be described for illustrative purposes. Client-side CIS process 12 may be incorporated into server-side CIS process 10 and may be executed within one or more applications that allow for communication with client-side CIS process 12. However, this is not intended to be a limitation of this disclosure, as other configurations are possible (e.g., stand-alone, client-side CIS processes and/or stand-alone server-side CIS processes.) For example, some implementations may include one or more of client-side CIS processes 14, 16, 18 in place of or in addition to client-side CIS process 12.

Referring now to FIGS. 1-5, CIS process 10 may determine 100 a context of a communication. As shown in FIG. 3, a communication (e.g., email message 302) may be sent using a communication management application (e.g., an email application and/or an IM chat application). Email message 302 may include "From" field 304, "To" field 306, "Cc" field 308, and "Subject" field 310. For example, email message 302 may be sent from Brenda, who may be a manager, to Grace, who may be a supervisor. Brenda may "Cc" employees Steph and Allison. Further, the subject of Brenda's email message may be "Winter Meeting". Email message 302 may also include email body 312, which may be text that Brenda has entered, and sent time 318, which may be the time that Brenda sent email message 302 to Grace.

Figure 4:
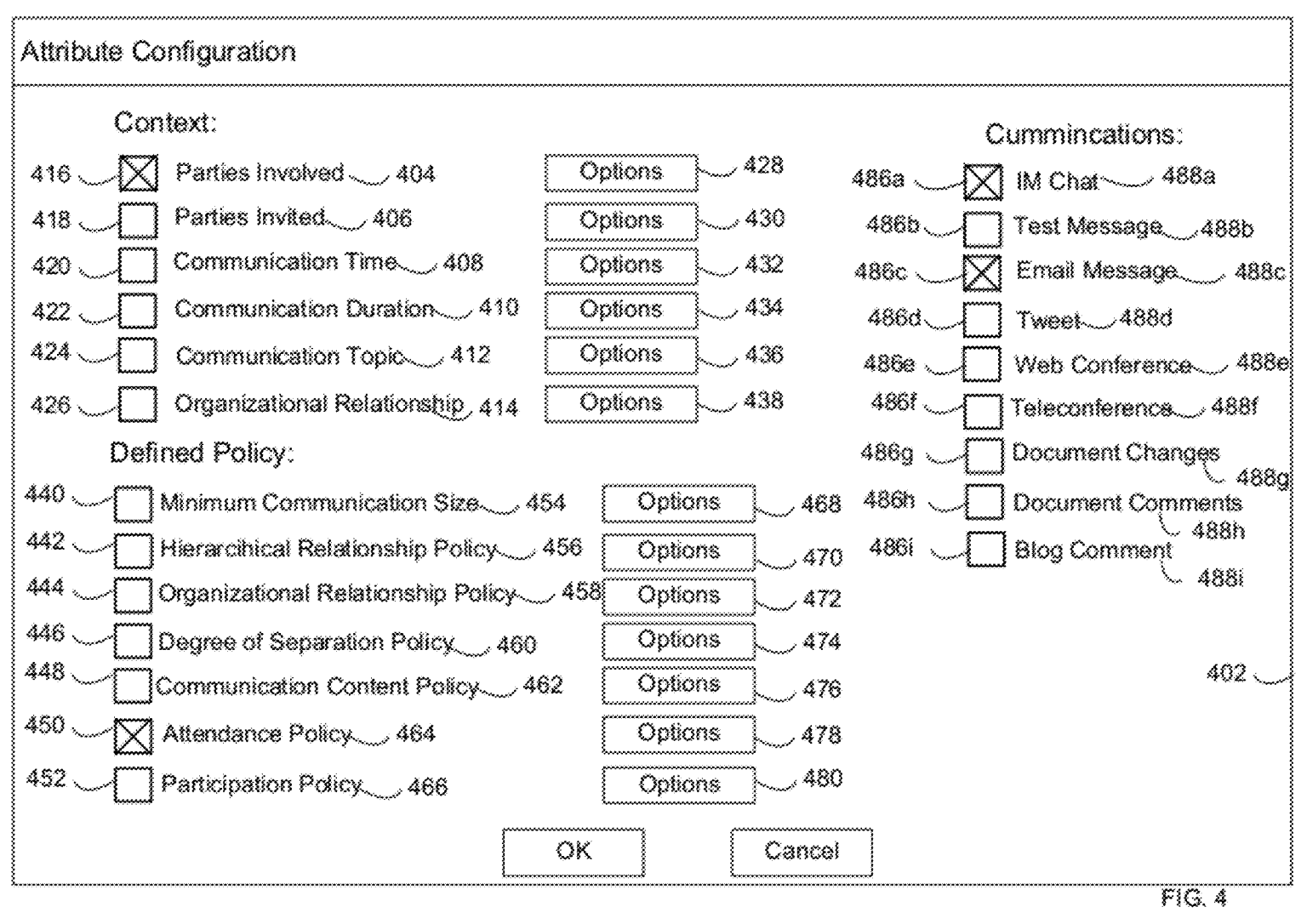

Assume for example that Brenda and Grace email each other regularly and would like to get summaries of their email messages. CIS process 10, which, as discussed above, may be part of or may integrate with a communication management application (e.g., an email application and/or an IM chat application), and may allow Brenda and/or Grace to receive summaries of their email messages. Further, assume that Brenda and/or Grace desire email summaries of different sizes, and desire summaries for messages in which their employees (e.g., Steph) are Cc'ed. Referring now to FIG. 4, Brenda and/or Grace may select one or more contexts (e.g., contexts 404, 406, 408, 410, 412, and 414) via one or more of checkboxes 416, 418, 420, 422, 424, and 426 on attribute configuration interface 402. Attribute configuration interface 402 may be available from one or more interfaces of the communication management application (e.g., an email application and/or an IM chat application) such as an email draft interface or inbox interface (not shown). CIS process 10 may render attribute configuration interface 402 in response to selection of a button on the email draft interface and/or email inbox. Checkboxes 416, 418, 420, 422, 424, and 426 may correspond to contexts 404, 406, 408, 410, 412, and 414, respectively, which may be, as indicated by attribute configuration interface 402, parties involved, parties invited, communication time, communication duration, communication topic, and organizational relationship, respectively. One or more of these contexts may be included (110) in the context of the communication. The contexts shown in attribute configuration interface 402 are shown for exemplary purposes and various other contexts may also be available for configuration.

Figure 5:
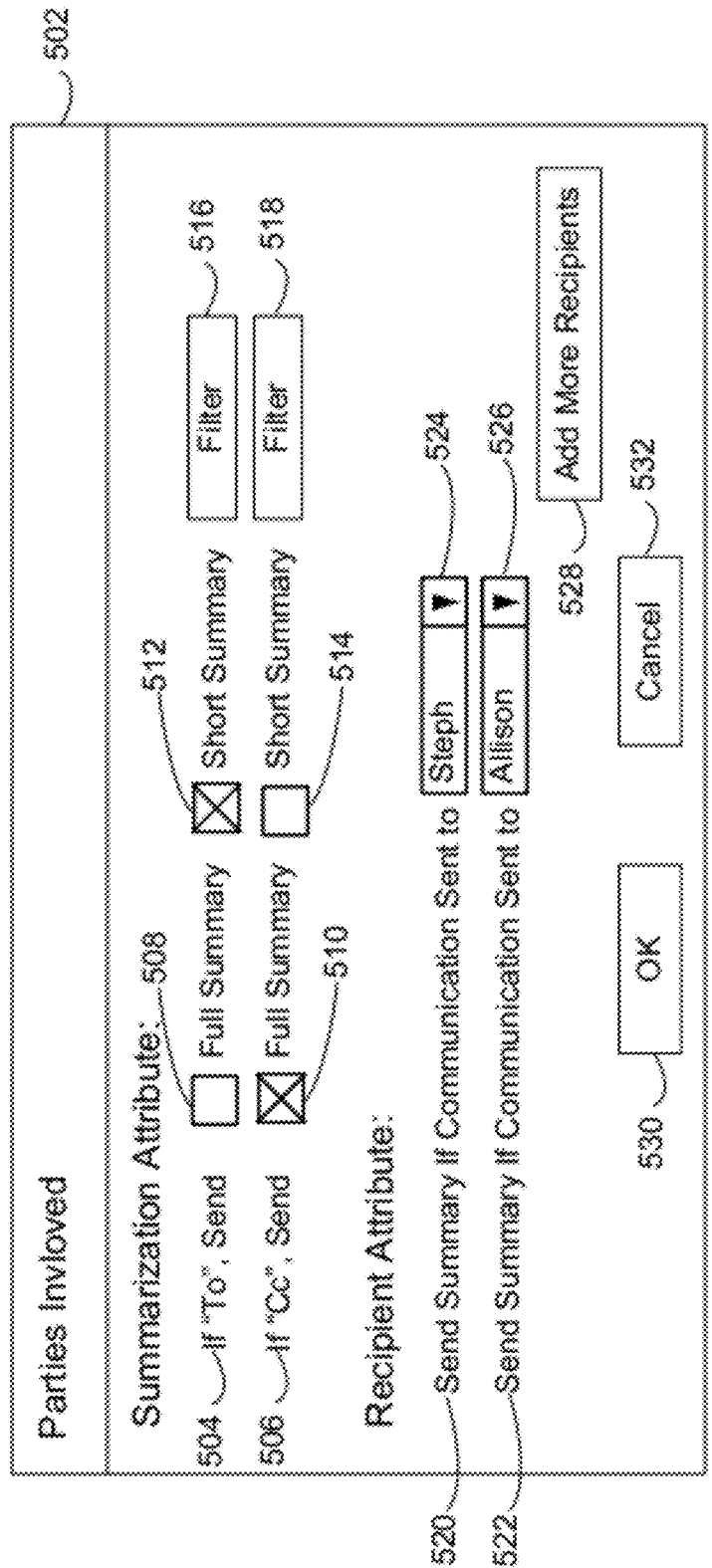
FIG. 5 is another graphical user interface that may be associated with the context-informed summarization process of FIG. 1.

Assume for example that a user (e.g., Brenda) checks checkbox 416 which may correspond to parties involved. Brenda may then select button 428 which may also correspond to parties involved. Brenda may also select buttons 430, 432, 434, 436, and 438 which may correspond to the other configurable contexts listed, respectively. Referring now to FIG. 5, in response, CIS process 10 may render parties involved interface 502, through which Brenda may configure one or more summarization attributes (e.g., summarization attributes 504 and 506) and/or one or more recipient attributes (e.g., recipient attributes 520 and 522). Summarization attributes 504 and 506 may correspond to, for example, and as shown in FIG. 5, summarization length. Further, buttons 516 and 518 may correspond to summarization filters. Brenda may select one or more of checkboxes 508, 510, 512, and 514 which correspond to a full summary or a short summary (i.e., summarization attributes). By selecting one or more of checkboxes 508, 510, 512, and 514, Brenda may configure CIS process 10 to create a full summary or a short summary depending on whether or not a recipient is in the "To" field of the email message or the "Cc" field of the email message. Additionally Brenda may select one or more of buttons 516 and/or 518 to configure one or more summarization filters for the summary (e.g., summary 314 and/or summary 316).

Continuing with the above example, Brenda may select one or more recipient attributes 520 and 522 via parties involved interface 502. Dropdown menus 524 and/or 526 may, for example, each include a list of employees and/or others to which communications (e.g., email message 302) may be sent. Brenda may select her employees (e.g., Steph and Allison) via parties involved interface 502. This may trigger CIS process 10 to send Brenda a summary (e.g., summary 314) of an email message (e.g., email message 302) she sends if it is sent to Steph and/or Allison. Brenda may select more employees or others by selecting button 528, which may allow Brenda to add more recipients. When finished, Brenda may select button 530 (e.g., "Ok") to confirm the selections or button 532 (e.g., "Cancel") to cancel them.

Assume for example that Brenda confirms the selections discussed above. Once Brenda sends email message 302, CIS process 10 may determine 100 a context (e.g., contexts 404, 406, 408, 410, 412, and/or 414) of the communication (e.g., email message 302). CIS process 10 may also determine 102 a summarization attribute (e.g., summarization attribute 504 and/or 506) for the communication (e.g., email message 302) based upon, at least in part, the context (e.g., one or more of contexts 404, 406, 408, 410, 412, and/or 414) of the communication (e.g., email message 302). Further, CIS process 10 may create 104 a summary (e.g., summary 314 and/or 316) of the communication (e.g., email message 302) based upon, at least in part, the summarization attribute (e.g., summarization attribute 504 and/or 506). As shown in FIGS. 3-5, and for exemplary purposes only, since context 404 (i.e., parties involved) was selected, CIS process 10 may determine 100 that parties involved is the context. Further, since checkbox 510 (corresponding to full summary) was selected, CIS process 10 may determine 102 that full summary is a summarization attribute. CIS process 10 may create 104 a summary (e.g., summary 314) of the communication (e.g., email message 302) based upon, at least in part, the summarization attribute (e.g., summarization attribute 506), which may be a full summary (shown in summary 314 as "Winter Meeting Lunch Reservation Tomorrow").

In an implementation, CIS process 10 may determine 106 a recipient attribute (e.g., recipient attribute 520 and/or 522) for the summary (e.g., summary 314 and/or 316) of the communication (e.g., email message 302) based upon, at least in part, the context (e.g., context 404 or parties involved) of the communication (e.g., email message 302). For exemplary purposes only, and as shown in FIG. 5, Brenda selected Steph and Allison via dropdown menus 524 and 526 to configure recipient attributes 520 and 522. CIS process 10 may determine 106 that the recipient attribute is whether or not a communication is sent to either Steph and/or Allison. Further, CIS process 10 may send 108 the summary (e.g., summary 314) of the communication (e.g., email message 302) to a recipient (e.g., Brenda) based upon, at least in part, the recipient attribute (e.g., recipient attribute 520 and/or 522). Since email message 302 was sent to Steph and Allison, CIS process 10 may send email summary 314 to Brenda.

It should be noted that while Brenda is the recipient in this example, other recipients (e.g., Grace, Steph, and/or Allison) are possible. For example, one or more of Grace, Steph, and/or Allison may configure their own attributes via one or more interfaces similar to attribute configuration interface 402 and parties involved interface 502. Further, Brenda, as a manager, may have rights to and may configure attributes for one or more of Grace, Steph and Allison such that context-informed summaries (e.g., summary 316) of communications (e.g., email 302) are sent to them.

Further, while CIS process 10 is discussed above as summarizing one email (e.g., email message 302), CIS process 10 may summarize a number of related or connected emails, such as an email chain. In this way, the communication (e.g., email message 302) may include (118) multiple communications and the summary of the communication may include summaries of one or more of the multiple communications. The summary of the communication may also include concatenated summaries of multiple emails that are related or connected. The summaries of the multiple communications may be based upon, at least in part a defined policy (e.g., defined policies 454-466) such as an organizational relationship policy. Additionally, CIS process 10 may use a configuration configured through attribute configuration interface 402 to automatically create and send summaries each time a communication that meets the selected configuration takes place. In this way CIS process 10 may create and send context-informed summaries on a recurring basis.

An organizational relationship policy may be set via attribute configuration interface 402 by selecting button 472. This may cause CIS process 10 to render an organizational relationship policy interface (not shown). A user may indicate, for example, that the user desires to receive summaries of communications only where the communication includes one or more parties senior to the user. Further, if the user is a manager (e.g., Brenda), the user may impose an organizational relationship policy such that a summary is propagated to all the user's employees. Further, CIS process 10 may be implemented as a business policy, where CIS process 10 is enabled only for all users in certain departments (e.g., an HR department). Any of these policies may be combined with other policies such as, for example, minimum communication size policy 454.

It should further be noted that while the communication described in the above example is an email message, CIS process 10 may create context-informed summaries of communications of various other types in a similar manner. For example, the communications may be (122) one or more of communications 488a (i.e., IM chat), 488b (i.e., text message and/or text message chain), 488c (i.e., email message or email chain), 488d (i.e., tweet or series of tweets), 488e (i.e., web conference), 488f (i.e., teleconference), 488g (i.e., document changes or series of document changes), 488h (i.e., document comments or series of document comments), and/or 488i (i.e., a blog comment or series of blog comments). Communications 488a-488i may be selected via attribute configuration interface 402 using checkboxes 486a-486i, respectively. As discussed above, CIS process 10 may create 104 context-informed summaries for multiple communications including but not limited to a text message chain, an email chain, a series of tweets, a series of document changes, a series of document comments and/or a series of blog comments. CIS process 10 may further use transcripts of web conferences and/or teleconferences to create context-informed summaries.

For example, Brenda may communicate with many employees via IM chat on a daily basis. She may set up IM chat meetings and invite employees to join. Brenda may like summaries of her IM chats so she does not have to look back through the whole chat to see what it was about. Further, Brenda may wish for her employees to get these summaries as well. Brenda may also wish for her employees to get IM chat summaries based upon, at least in part, whether or not they were present or absent in the IM chat. CIS process 10 may provide context-informed summaries of IM chats in a manner similar to that described above for email messages. For example, if Brenda selects IM chat checkbox 486a via attribute configuration interface 402, CIS process 10 may create 104 a summary of Brenda's IM chats based upon, at least in part, one or more summarization attributes selected.

Figure 6:
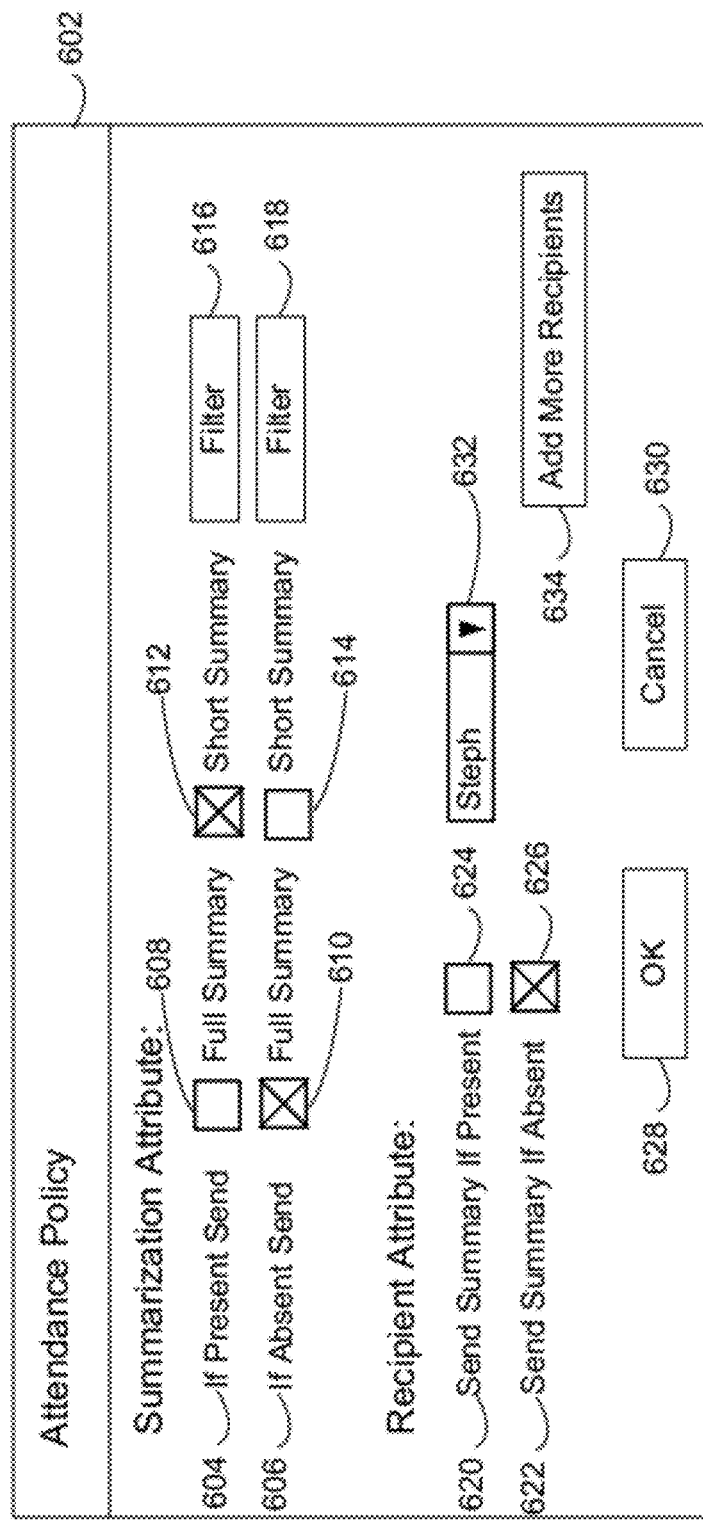
FIG. 6 is another graphical user interface that may be associated with the context-informed summarization process of FIG. 1.

Referring now to FIGS. 4 and 6, at least one of the summarization attribute (e.g., summarization attributes 604 and 606) and the recipient attribute (e.g., recipient attributes 620 and 622) may be further determined 112 based upon, at least in part, a defined policy (e.g., defined policies 454, 456, 458, 460, 462, 464, and 466). Defined policies 454, 456, 458, 460, 462, 464, and 466 may correspond to one or more of a minimum communication size, a hierarchical relationship policy, an organizational relationship policy, a degree of separation policy, a communication content policy, an attendance policy, and a participation policy. An organizational policy and/or a hierarchical relationship may be based upon a corporate directory, for example, and may be based upon a defined data structure. CIS process 10 may also use a Lightweight Directory Access Protocol (LDAP) to determine an organizational policy and/or a hierarchical relationship. A user (e.g., Brenda) may select one or more of checkboxes 440, 442, 444, 446, 448, 450, and 452 via attribute configuration interface 402 to select one or more of defined policies 454, 456, 458, 460, 462, 464, and 466. In this way, the defined policy may include (116) one or more of the policies above.

Further, Brenda may select button 478 which may correspond to attendance policy 464. Brenda may also select buttons 468, 470, 472, 474, 476, and 480 which may correspond to the other configurable policies listed, respectively. Referring now to FIG. 6, in response, CIS process 10 may render attendance policy interface 602, through which Brenda may configure one or more summarization attributes (e.g., summarization attributes 604 and 606) and/or one or more recipient attributes (e.g., recipient attributes 620 and 622). Summarization attributes 604 and 606 may correspond to, for example, and as shown in FIG. 6, summarization length. Further, buttons 616 and 618 may correspond to summarization filters. Brenda may select one or more of checkboxes 608, 610, 612, and 614 which may correspond to a full summary or a short summary (i.e., summarization attributes). By selecting one or more of checkboxes 608, 610, 612, and 614, Brenda may configure CIS process 10 to create a full summary or a short summary depending on whether or not a recipient was present in an IM chat meeting. Additionally Brenda may select one or more of buttons 616 and/or 618 to configure one or more summarization filters for the summary (e.g., summary 314 and/or summary 316). In this way, at least one of a length of the summary of the communication and one or more filters for the summary of the communication may be (114) based upon, at least in part, a defined policy (e.g., attendance policy 464).

Continuing with the above example, Brenda may select one or more recipient attributes 620 and 622 via attendance policy interface 602. Dropdown menu 632 may, for example, include a list of employees and/or others that may be invited to, be present in, and/or may participate in an IM chat. Brenda may select her employees, (e.g., Steph) via attendance policy interface 602. Further, Brenda may select checkboxes 624 and/or 626. This may trigger CIS process 10 to send 108 Steph a summary (not shown) of an IM chat based upon whether or not Steph is present or absent in the IM chat. Brenda may select more employees or others by selecting button 634, which may allow Brenda to add more recipients. When finished, Brenda may select button 628 (e.g., "Ok") to confirm the selections or button 630 (e.g., "Cancel") to cancel them.

In an implementation, a graphical user interface similar to those in one or more of FIGS. 4-6 may be used to select summarization attributes and/or recipient attributes for summaries of communications to be received. For example, a manager may wish to receive summaries of communications (e.g., email messages, IM chats, etc.) between the manager's employees and customers. In this implementation, rather than the manager selecting employees one at a time, as shown in FIGS. 5 and 6, the graphical user interface may allow the manager to select groups of employees or departments. For example, rather than selecting individuals in one or more of dropdown menus 524, 526, and/or 632, the manager may select one or more groups and/or departments (e.g., "customer service department") from the dropdown menu. CIS process 10 may use a corporate directory (discussed above) to pull group and/or department information into one or more dropdown menus. In another example, the graphical user interface may allow the manager to check a checkbox indicating that the manager wishes to receive summaries of all customer communications with the customer service department. In this way, a manager may elect to receive context-informed summaries of communications (e.g., email messages, IM chats, etc.) taking place between the manager's employees and customers.

While CIS process 10 may send a summary of a communication via the same means the through which the communication took place, other configurations are possible. For example, if the summary is a summary of an email communication or an IM chat, the summary may also be sent by email and/or IM chat. However, if the summary is a summary of an IM chat, the summary may be sent to recipients by email. Further the summary may also be sent via other communication channels, such as via social networking channels. For example, the summary may be sent to a social networking user's "wall". Further, the summaries may be sent to a storage system and/or database and stored for future use.

Since different users (e.g., Brenda and Grace) may configure different contexts, defined policies, summarization attributes, and recipient attributes, different summaries (e.g., summaries 314 and 316) of the same communication may be created (120) based upon, at least in part, different defined policies of two or more parties (e.g., Brenda and Grace) involved in the communication. For example, and as shown in FIG. 3, Brenda may desire a full summary, or summary of different length, than Grace. Grace may desire a short summary, or summary of different length, than Brenda. In this way. CIS process 10 may create 106 and send 108 summaries of different lengths to different users.

CIS process 10 may use conventional summarizing techniques to create summaries of communications based on their content. CIS process 10 may also create summaries based upon who was present in the communication, the relationships of people in the communication (e.g., organizational relationships), and who made statements in the communication. Further, the summary may include a subset of words from the communication and/or a word count.

While specific examples are discussed above, it should be noted that CIS process 10 may use any number of configurations to create and/or send context-informed summaries. For example, attribute configuration interface 402 may be used to select specific users (e.g., parties involved) create summaries only where an email and/or IM chat is greater than a minimum communication size (e.g., minimum communication size 454, which may be set to 30 lines, for example). Further, if an IM chat has a short duration (e.g., communication duration 410), a summary length may be affected (e.g., full summary vs. short summary). If the IM chat is very short, the entire IM chat may be forwarded, and a user may be informed that it was a non-summarized interaction. Additionally, buttons 516, 518, 616, and 618 may be selected and may cause CIS process 10 to render a filter configuration interface (not shown). Through the filter configuration interface, noise and/or common words in the communication such as "the", "hello", etc., may be filtered out of the summary. CIS process 10 may further be configured such that a summary is sent when there is an interaction (e.g., a communication) between two third parties, which may involve a leveraging of trust policies. Further, CIS process 10 may be configured such that summaries are created based upon specific events, such as after engaging with a customer, or when the tone of a communication becomes abusive.

In an implementation, context-informed summaries may be created by request while the user is viewing the full communication. For example, the user may request a summary of an email by selecting a button on the email itself. An email application and/or email system interfacing with CIS process 10 may have knowledge of an email tree to which an email message belongs. The email tree may include various forwards and responses of which the email is part. The topology of the tree, the involved users, and the message contents may be given in summary form to the requesting user. The ability to use this functionality may be based upon an organizational relationship policy, such as a position within an organization, preferences of the participants, relationship of the participants, etc. A common subject, key words in the subject or body, or other manners of associating commonality of email messages may be used to determine related emails and what to include in the summary.

In an implementation, an administrator may define context-informed summarization policies for an entire department. For example, IM encounters with abusive customers may result in IM chat summaries being propagated to the relevant manager. Further, CIS process 10 may leverage information from a social network to create and send context-informed summaries based upon a defined policy. For example, summaries of communications a user has with other users "close" to the user, as determined by the social network, may be propagated back to the user. Further, members of a social network that may have been unable to participate in an IM chat may receive summaries of the chat. Participation policy 466 may be used to send summaries to users who were present at the communication (e.g., an IM chat) but did not participate. This may indicate redirection of their attention to, for example, a telephone call. As mentioned above, summaries of the communications may also include concatenated summaries of multiple communications that are related or connected. For example, a user may elect to have all IM chats summarized on a daily basis with a particular group of colleagues. This may allow for time and project based context-informed summarization capability.

Additionally, CIS process 10 may create a dated WORM record (i.e., write once, read many times) that may be used for validation of the timing of a communication and/or conversation. WORM aspects may be selectable for any chat, or may be topic, person, or profile based. Selecting a WORM record may reset the degree of summarization (e.g., length and/or compression). For example, language (e.g., crude language) that may have been filtered out of the communication for the summary and may be preserved in the WORM record.

In an implementation, an IM chat, email, or other communication can be tagged by a sender, recipient, or participant. The tag may indicate a subject, topic, or other reference, and may be used to create a summary. A user may request that all communications with a certain tag be included in a summary. Further, a user viewing a summary may rate the communication and/or interaction as valuable or invaluable, or on a rating scale. The user may then keep rating data of communications to determine what topics and users they enjoy communicating about and with. Additionally, the summary may include metadata on the communication and/or interaction, such as a word count, timing, number of users participating, etc. Moreover, a user may directly communicate with the group of participants involved in a communication for which the user received a summary.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   determining, via a computing device including a server computing device, a context of a communication;
   rendering, via the computing device an attribute configuration interface in response to an input within a communication management application;
   selecting, via the computing device, within the rendered attribute configuration interface a summarization attribute for the communication based upon, at least in part, the context of the communication, wherein the summarization attribute includes at least one of a full summary and a short summary based upon, at least in part, the context of the communication;
   creating a first summary and a second summary of the communication based upon, at least in part, the summarization attribute, including filtering common words out of the communication to create the first summary and the second summary;
   determining importance of topics in the communication based upon, at least in part, a rating given to the communication by a user viewing one of the first summary and the second summary of the communication;
   wherein creating the first summary and the second summary of the communication is based upon, at least in part, keywords in the subject of the communication, and keywords in the body of the communication;
   wherein each summary of the communication is customized for each user based upon, at least in part, user-defined configurations including the context of the communication and type of communication;
   sending the first summary of the communication to a first user; and
   sending the second summary of the communication to a second user, wherein the first summary of the communication and the second summary of the communication are different,
   wherein each summary is sent via one or more communication channels of a network to a client computing device, wherein a selection of the one or more communication channels is customized, and wherein additional summaries are created and sent for related communications on a recurring basis.

2. The method of claim 1, further comprising:
   determining a recipient attribute for the first summary and the second summary of the communication based upon, at least in part, the context of the communication.

3. The method of claim 2, further comprising:
   sending the first summary of the communication to a first recipient and the second summary of the communication to a second recipient based upon, at least in part, the recipient attribute.

4. The method of claim 1, wherein the context of the communication includes at least one of: one or more parties involved, one or more parties invited, a time of the communication, a duration of the communication, a topic of the communication, and an organizational relationship of the one or more parties involved.

5. The method of claim 2, wherein at least one of the summarization attribute and the recipient attribute is further determined based upon, at least in part, a defined policy.

6. The method of claim 1, wherein at least one of a length of the first summary and the second summary of the communication and one or more filters for the first summary and the second summary of the communication is based upon, at least in part, a defined policy.

7. The method of claim 5, wherein the defined policy includes at least one of: a minimum communication size, a hierarchical relationship policy, an organizational relationship policy, a degree of separation policy, a communication content policy, an attendance policy, and a participation policy.

8. The method of claim 1, wherein the communication includes multiple communications and the first summary and the second summary of the communication includes summaries of one or more of the multiple communications based upon, at least in part, an organizational relationship policy.

9. The method of claim 1, wherein the different summaries of the communication are created based upon, at least in part, different defined policies of two or more parties involved in the communication.

10. The method of claim 1, wherein the communication is at least one of: an instant message chat, a text message, a text message chain, an email, an email chain, a tweet, a series of tweets, a blog comment, a series of blog comments, a web conference, a teleconference, a series of changes made to a document, and a series of comments made regarding a document.

11. A computer program product residing on a non-transitory computer readable storage medium having a plurality of instructions stored thereon, which, when executed by a processor, cause the processor to perform operations comprising:
   determining, via a server computing device, a context of a communication;
   rendering an attribute configuration interface in response to an input within a communication management application;

selecting within the rendered attribute configuration interface a summarization attribute for the communication based upon, at least in part, the context of the communication, wherein the summarization attribute includes at least one of a full summary and a short summary based upon, at least in part, the context of the communication;

creating a first summary and a second summary of the communication based upon, at least in part, the summarization attribute, including filtering common words out of the communication to create the first summary and the second summary;

determining importance of topics in the communication based upon, at least in part, a rating given to the communication by a user viewing one of the first summary and the second summary of the communication;

wherein creating the first summary and the second summary of the communication is based upon, at least in part, keywords in the subject of the communication, and keywords in the body of the communication;

wherein each summary of the communication is customized for each user based upon, at least in part, user-defined configurations including the context of the communication and type of communication;

sending the first summary of the communication to a first user; and sending the second summary of the communication to a second user, wherein the first summary of the communication and the second summary of the communication are different, wherein each summary is sent via one or more communication channels of a network to a client computing device, wherein a selection of the one or more communication channels is customized, and wherein additional summaries are created and sent for related communication on a recurring basis.

12. The computer program product of claim 11, further comprising instructions for:

determining a recipient attribute for the first summary and the second summary of the communication based upon, at least in part, the context of the communication.

13. The computer program product of claim 12, further comprising instructions for:

sending the first summary of the communication to a first recipient and the second summary of the communication to a second recipient based upon, at least in part, the recipient attribute.

14. The computer program product of claim 11, wherein the context of the communication includes at least one of: one or more parties involved, one or more parties invited, a time of the communication, a duration of the communication, a topic of the communication, and an organizational relationship of the one or more parties involved.

15. The computer program product of claim 12, wherein at least one of the summarization attribute and the recipient attribute is further determined based upon, at least in part, a defined policy.

16. The computer program product of claim 11, wherein at least one of a length of the first summary and the second summary of the communication and one or more filters for the first summary and the second summary of the communication is based upon, at least in part, a defined policy.

17. The computer program product of claim 15, wherein the defined policy includes at least one of: a minimum communication size, a hierarchical relationship policy, an organizational relationship policy, a degree of separation policy, a communication content policy, an attendance policy, and a participation policy.

18. The computer program product of claim 11, wherein the communication includes multiple communications and the first summary and the second summary of the communication includes summaries of one or more of the multiple communications based upon, at least in part, an organizational relationship policy.

19. The computer program product of claim 11, wherein the different summaries of the communication are created based upon, at least in part, different defined policies of two or more parties involved in the communication.

20. The computer program product of claim 11, wherein the communication is at least one of: an instant message chat, a text message, a text message chain, an email, an email chain, a tweet, a series of tweets, a blog comment, a series of blog comments, a web conference, a teleconference, a series of changes made to a document, and a series of comments made regarding a document.

\* \* \* \* \*